United States Patent
Kuroki et al.

(10) Patent No.: US 8,453,623 B2
(45) Date of Patent: Jun. 4, 2013

(54) GAS CIRCULATION ENGINE

(75) Inventors: Rentaro Kuroki, Susono (JP); Daisaku Sawada, Gotmeba (JP); Shinichi Mitani, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 393 days.

(21) Appl. No.: 12/993,396

(22) PCT Filed: May 19, 2009

(86) PCT No.: PCT/IB2009/005648
§ 371 (c)(1), (2), (4) Date: Nov. 18, 2010

(87) PCT Pub. No.: WO2009/141707
PCT Pub. Date: Nov. 26, 2009

(65) Prior Publication Data
US 2011/0067664 A1    Mar. 24, 2011

(30) Foreign Application Priority Data

May 20, 2008    (JP) .................................. 2008-132543

(51) Int. Cl.
*F02B 43/00*    (2006.01)
*F02B 43/04*    (2006.01)

(52) U.S. Cl.
USPC ...................................... 123/527; 123/568.11

(58) Field of Classification Search
USPC ................ 123/527, 568.11, 1 A, 3, 575, 456, 123/DIG. 12; 701/103, 104; 60/279, 295, 60/39.511, 39.5, 39.52, 794
See application file for complete search history.

(56) References Cited

U.S. PATENT DOCUMENTS

| 3,101,592 A | * | 8/1963 | Robertson et al. | 60/39.463 |
| 3,702,110 A | * | 11/1972 | Hoffman et al. | 60/279 |
| 3,775,976 A | * | 12/1973 | Karig | 60/801 |

(Continued)

FOREIGN PATENT DOCUMENTS

| DE | 43 21 221 | 1/1995 |
| DE | 198 27 439 | 1/1999 |

(Continued)

OTHER PUBLICATIONS

International Search Report issued Nov. 26, 2009 in PCT/IB09/005648 filed May 19, 2009.

*Primary Examiner* — Mahmoud Gimie
(74) *Attorney, Agent, or Firm* — Oblon, Spivak, McClelland, Maier & Neustadt, L.L.P.

(57) ABSTRACT

A gas circulation engine includes a combustion chamber to which high-pressure fuel in a first high-pressure fuel supply passage, an oxidant and working gas are supplied; a circulation path that connects an intake-side portion and an exhaust-side portion of the combustion chamber to each other; a fuel bleed-off tank into which the high-pressure fuel in the first high-pressure fuel supply passage is bled off; a fuel bleed-off valve that permits or shuts off communication between the first high-pressure fuel supply passage and the fuel bleed-off tank; and a fuel bleed-off control unit that permits communication between the first high-pressure fuel supply passage and the fuel bleed-off tank by opening the fuel bleed-off valve when the engine is stopped, the communication between the first high-pressure fuel supply passage and the fuel bleed-off tank being shut off during operation of the engine.

14 Claims, 8 Drawing Sheets

U.S. PATENT DOCUMENTS

| | | | |
|---|---|---|---|
| 3,877,447 A * | 4/1975 | Ross, Sr. | 60/278 |
| 4,326,483 A * | 4/1982 | Lowther | 123/3 |
| 5,967,126 A | 10/1999 | Ofner | |
| 2008/0245349 A1 | 10/2008 | Mitani et al. | |

FOREIGN PATENT DOCUMENTS

| | | |
|---|---|---|
| JP | 10-212981 | 8/1998 |
| JP | 10-220301 | 8/1998 |
| JP | 11 93681 | 4/1999 |
| JP | 2007-64197 | 3/2007 |
| JP | 2007 247524 | 9/2007 |
| WO | 2007 031839 | 3/2007 |

\* cited by examiner

GAS CIRCULATION ENGINE

BACKGROUND OF THE INVENTION

1. Field of the Invention

The invention relates generally to a gas circulation engine that has a combustion chamber and a circulation path that connects an intake-side portion and an exhaust-side portion of the combustion chamber to each other. More specifically, the invention relates to a working gas circulation engine that has a combustion chamber which is supplied with an oxidant, fuel, the combustion (oxidation) of which is promoted by the oxidant, and working gas that generates power with the use of combustion of the fuel, and a circulation path that connects an intake-side portion and an exhaust-side portion of the combustion chamber to each other, and that is formed in such a manner that the working gas is circulated back to the combustion chamber through the circulation path without being released into the atmosphere.

2. Description of the Related Art

Working gas circulation engines of this type are so-called closed-cycle engines, and described in, for example, Japanese Patent Application Publication No. 11-93681 (JP-A-11-93681) and Japanese Patent Application Publication No. 2007-247524 (JP-A-2007-247524). In the working gas circulation engines described in JP-A-11-93681 and JP-A-2007-247524, oxygen and hydrogen are supplied to a combustion chamber as an oxidant and fuel, respectively, and argon is circulated as working gas in order to enhance the thermal efficiency. In these working gas circulation engines, argon is thermally expanded due to the combustion of hydrogen that takes place in the combustion chamber. The thermal expansion of argon pushes a piston down so that power is produced. Because water vapor is generated due to the combustion of hydrogen that takes place in the combustion chamber, the water vapor is discharged into a circulation path along with the argon. Therefore, in the working gas circulation engines, a condenser that liquefies the water vapor to remove it is provided in the circulation path so that only argon, which is used as the working gas, is circulated back to the combustion chamber.

In the working gas circulation engines that are the closed-cycle engines, the fuel and the oxidant are stored in respective tanks at high pressures, and supplied from the tanks at high pressures. Therefore, after the engine is stopped, the fuel and the oxidant remain in respective supply paths at high pressures. Accordingly, the high-pressure fuel and the high-pressure oxidant may leak into the combustion chamber and the circulation path through, for example, a fuel injection device that injects the fuel, an oxidant supply device that supplies the oxidant, and a clearance between an intake valve and a cylinder head. If the fuel and the oxidant leak into, for example, the combustion chamber, the amount of fuel and the amount of oxidant in the combustion chamber exceed target supply amounts when the engine is restarted or after the engine is restarted. This may cause some inconveniences, for example, this hinders proper combustion of the fuel.

SUMMARY OF THE INVENTION

The invention provides a gas circulation engine in which excess supply of fuel, etc. is minimized when an engine is restarted or after the engine is restarted.

A first aspect of the invention relates to a gas circulation engine that includes: a combustion chamber to which high-pressure fuel in a high-pressure fuel supply passage is supplied; a circulation path that connects an intake-side portion and an exhaust-side portion of the combustion chamber to each other; a fuel bleed-off tank into which the high-pressure fuel in the high-pressure fuel supply passage is bled off; a fuel bleed-off valve that permits or shuts off communication between the high-pressure fuel supply passage and the fuel bleed-off tank; and a fuel bleed-off control unit that permits communication between the high-pressure fuel supply passage and the fuel bleed-off tank by opening the fuel bleed-off valve when the engine is stopped. The communication between the high-pressure fuel supply passage and the fuel bleed-off tank is shut off during operation of the engine.

In the first aspect of the invention, an oxidant that promotes combustion of the fuel, and working gas that generates power with the use of combustion of the fuel and that has a specific heat ratio higher than a specific heat ratio of air may be supplied to the combustion chamber, and the circulation path may connect the intake-side portion and the exhaust-side portion of the combustion chamber to each other in such a manner that the working gas discharged from the combustion chamber is circulated back to the combustion chamber without being discharged into the atmosphere.

In the gas circulation engine according to the first aspect of the invention, the fuel in the high-pressure fuel supply passage is bled off into the fuel bleed-off tank when the engine is stopped.

The gas circulation engine according to the first aspect of the invention may further include a high-pressure working gas storage tank in which the working gas is stored at a pressure that is higher than the pressure of the fuel in the high-pressure fuel supply passage; and a working gas supply valve that permits or shuts off communication between the high-pressure working gas storage tank and the high-pressure fuel supply passage. The fuel bleed-off control unit may open the working gas supply valve when the engine is stopped.

With this structure, the fuel in the high-pressure fuel supply passage is forcibly bled off into the fuel bleed-off tank by the working gas in the high-pressure working gas storage tank when the engine is stopped.

The gas circulation engine according to the first aspect of the invention may further include: a bled-off fuel supply valve that permits or shuts off communication between the fuel bleed-off tank and an intake passage; and a bled-off fuel control unit that permits communication between the fuel bleed-off tank and the intake passage by opening the bled-off fuel supply valve after the engine is restarted. The communication between the fuel bleed-off tank and the intake passage is shut off when the engine is stopped. With this structure, the bled-off fuel is supplied to the intake passage and burned in the combustion chamber. Therefore, it is possible to prevent waste of the fuel.

A second aspect of the invention relates to a gas circulation engine that includes: a combustion chamber to which a high-pressure oxidant in a high-pressure oxidant supply passage, and fuel, combustion of which is promoted by the oxidant, are supplied; a circulation path that connects an intake-side portion and an exhaust-side portion of the combustion chamber to each other; an oxidant bleed-off tank into which the high-pressure oxidant in the high-pressure oxidant supply passage is bled off; an oxidant bleed-off valve that permits or shuts off communication between the high-pressure oxidant supply passage and the oxidant bleed-off tank; and an oxidant bleed-off control unit that permits communication between the high-pressure oxidant supply passage and the oxidant bleed-off tank by opening the oxidant bleed-off valve when an engine is stopped. The communication between the high-pressure oxidant supply passage and the oxidant bleed-off tank is shut off during operation of the engine.

In the second aspect of the invention, working gas that generates power with the use of combustion of the fuel and that has a specific heat ratio higher than a specific heat ratio of the air may be supplied to the combustion chamber, and the circulation path may connect the intake-side portion and the exhaust-side portion of the combustion chamber to each other in such a manner that the working gas discharged from the combustion chamber is circulated back to the combustion chamber without being discharged into an atmosphere.

According to the second aspect of the invention, the oxidant in the high-pressure oxidant supply passage is bled off into the oxidant bleed-off tank when the engine is stopped.

The gas circulation engine according to the second aspect of the invention may further include a high-pressure working gas storage tank in which the working gas is stored at a pressure that is higher than a pressure of the oxidant in the high-pressure oxidant supply passage, and a working gas supply valve that permits or shuts off communication between the high-pressure working gas storage tank and the high-pressure oxidant supply passage. The oxidant bleed-off control unit may open the working gas supply valve when the engine is stopped.

According to the second aspect of the invention, the oxidant in the high-pressure oxidant supply passage is forcibly bled off into the oxidant bleed-off tank by the working gas in the high-pressure working gas storage tank when the engine is stopped.

The gas circulation engine according to the second aspect of the invention may further include: a bled-off oxidant supply valve that permits or shuts off communication between the oxidant bleed-off tank and an intake passage; and a bled-off oxidant control unit that permits communication between the oxidant bleed-off tank and the intake passage by opening the bled-off oxidant supply valve after the engine is restarted. The communication between the oxidant bleed-off tank and the intake passage is shut off when the engine is stopped. With the structure described above, the bled-off oxidant is supplied to the intake passage and burned in the combustion chamber. Therefore, it is possible to prevent waste of the oxidant.

In the gas circulation engine according to the aspects of the invention described above, the fuel in the high-pressure fuel supply passage is bled off into the fuel bleed-off tank and the oxidant in the high-pressure oxidant supply passage is bled off into the oxidant bleed-off tank when the engine is stopped. Therefore, in the working gas circulation engine, leakage of the fuel and the oxidant into the combustion chamber is suppressed when the engine is stopped. Accordingly, it is possible to prevent excess supply of the fuel, etc. when the engine is restarted. As a result, combustion takes place in an appropriate manner.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Figure 1:
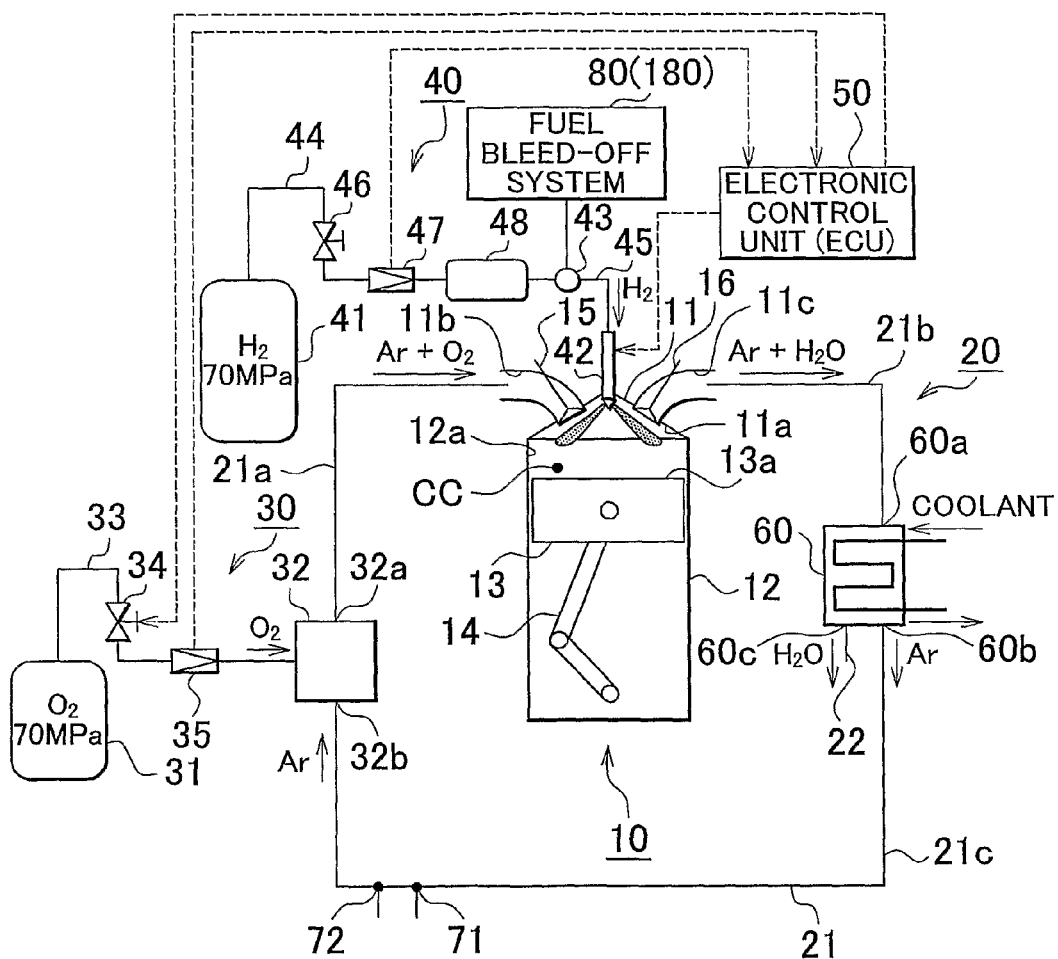
FIG. 1 is a view showing the overall structure of a gas circulation engine according to embodiments of the invention.
Figure 2:
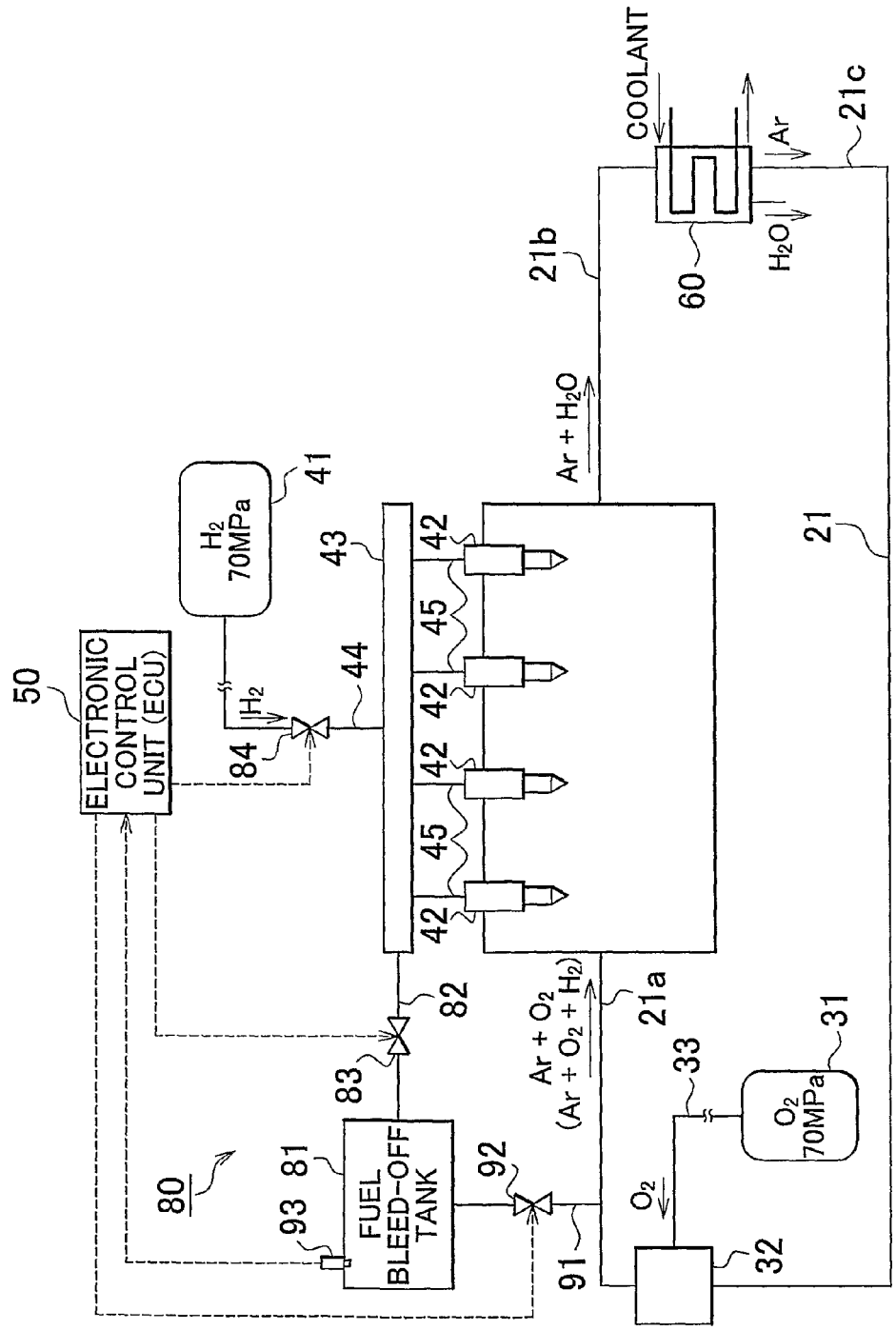
FIG. 2 is a view showing the structure of a gas circulation engine according to a first embodiment of the invention.

Hereafter, gas circulation engines according to example embodiments of the invention will be described in detail with reference to the accompanying drawings. Note that the invention is not limited to the example embodiments described below. Hereafter, a working gas circulation engine will be described as an example of the gas circulation engines.

Hereafter, a working gas circulation engine according to a first embodiment of the invention will be described with reference to FIGS. 1 to 4.

The working gas circulation engine according to the first embodiment of the invention is a so-called closed-cycle engine that has a combustion chamber which is supplied with an oxidant, fuel, the combustion (oxidation) of which is promoted by the oxidant, and working gas that generates power with the use of combustion of the fuel, and a circulation path which connects an intake-side portion and an exhaust-side portion of the combustion chamber to each other, and that is formed in such a manner that the working gas is circulated back to the combustion chamber through the circulation path without being released into the atmosphere. In the working gas circulation engine, the fuel is burned in the combustion chamber, whereby the working gas is thermally expanded to generate power.

First, the structure of the working gas circulation engine according to the first embodiment of the invention will be described with reference to FIG. 1.

The working gas circulation engine includes an engine body 10 in which a combustion chamber CC is formed, a circulation path 20 that connects an intake-side portion and an exhaust-side portion of the combustion chamber CC to each other, an oxidant supply device 30 that supplies an oxidant into the combustion chamber CC, and a fuel supply device 40 that supplies the fuel to the combustion chamber CC. The combustion chamber CC and the circulation path 20 are filled with the working gas, and the working gas discharged from the combustion chamber CC is circulated back to the combustion chamber CC through the circulation path 20.

First, the engine body 10 will be described.

The engine body 10 includes a cylinder head 11 in which the combustion CC is formed, a cylinder block 12, and a piston 13. The piston 13 is connected to a crankshaft (not shown) via a connecting rod 14, and is arranged in such a manner that the piston 13 may reciprocate within a space that is defined by a wall face of a recess 11*a* formed in a bottom face of the cylinder head 11 and a wall face of a cylinder bore 12*a* of the cylinder block 12. The combustion chamber CC is a space defined by the wall face of the recess 11*a* of the cylinder head 11, the wall face of the cylinder bore 12*a*, and a top face 13*a* of the piston 13.

An intake port 11b and an exhaust port 11c that constitute part of the circulation path 20 are formed in the cylinder head 11. The intake port 11b and the exhaust port 11c open at first ends into the combustion chamber CC. At an opening of the intake port 11b into the combustion chamber CC, there is provided an intake valve 15, which opens the opening when the intake valve 11b is opened and which closes the opening when the intake valve 11b is closed. At an opening of the exhaust port 11c into the combustion chamber CC, there is provided an exhaust valve 16, which opens the opening when the exhaust valve 11c is opened and which closes the opening when the exhaust valve 16 is closed.

For example, valves that are opened and closed in accordance with rotation of a camshaft (not shown) and elastic forces of elastic members (coil springs) may be used as the intake valve 15 and the exhaust valve 16. When this type of valves are used as the intake valve 15 and exhaust valve 16, a power transmission mechanism that is formed of, for example, a chain or a sprocket is provided between the camshaft and the crankshaft. With the power transmission mechanism, rotation of the camshaft is linked to rotation of the crankshaft. In this way, the intake valve 15 and the exhaust valve 16 are opened at prescribed opening timing and closed at prescribed closing timing. The engine body 10 may be provided with a variable valve mechanism, for example, a so-called variable valve timing and lift mechanism, which is able to change the opening timing/closing timing and the lift amounts of the intake valve 15 and the exhaust valve 16. With this structure, the opening timing/closing timing and the lift amounts of the intake valve 15 and the exhaust valve 16 may be changed appropriately based on an engine operating state. Alternatively, a so-called electromagnetically-driven valve that opens and closes the intake valve 15 and the exhaust valve 16 using an electromagnetic force may be used in the engine body 10. In this case, it is possible to obtain the same effects as those obtained by the variable valve operation mechanism.

Next, the circulation path 20 will be described.

The circulation path 20 is formed of the intake port 11b, the exhaust port 11c, and a circulation passage 21 that connects a second end of the intake port 11b and a second end of the exhaust port 11c to each other. With this structure, a closed space is formed within the circulation path 20 and the combustion chamber CC.

In the working gas circulation engine, the working gas is supplied into the closed space, and the working gas is circulated in such a manner that the working gas is supplied from the circulation path 20 into the combustion chamber CC through the intake port 11b, from the combustion chamber CC to the circulation path 20 through the exhaust port 11c, from the exhaust port 11c to the intake port 11b through the circulation passage 21. When the intake valve 15 is opened, the working gas in the circulation passage 21 is supplied into the combustion chamber CC through the intake port 11b. When the exhaust valve 16 is opened, the working gas in the combustion chamber CC is discharged together with the gas, which is obtained after the fuel is burned, to the circulation passage 21 through the exhaust port 11c. In this case, the working gas and the gas, which is obtained after the fuel is burned, are collectively referred to as exhaust gas. That is, the working gas discharged from the combustion chamber CC is circulated back to the combustion chamber CC through the circulation path 20 without being released into the atmosphere.

As the working gas, monatomic gas (more specifically, rare gas, for example, argon or helium) that has a specific heat ratio higher than that of air is used. In the first embodiment of the invention, argon (Ar) is used as the working gas.

More specifically, the circulation passage 21 according to the first embodiment of the invention is formed of a first circulation passage 21a, a second circulation passage 21b and a third circulation passage 21c. The first circulation passage 21a connects the second end of the intake port 11b to an outlet 32a of an oxidant supply unit 32, described later in detail, of the oxidant supply device 30. The second circulation passage 21b connects the second end of the exhaust port 11c to an exhaust gas inlet 60a of a condenser 60, described later in detail. The third circulation passage 21c connects a working gas outlet 60b of the condenser 60 to a working gas inlet 32b of the oxidant supply unit 32. For example, the first circulation passage 21a serves as an intake passage, and the second circulation passage 21b serves as an exhaust passage. A portion of the third circulation passage 21c on the side of the first circulation passage 21a serves as an intake passage, and a portion of the third circulation passage 21c on the side of the second circulation passage 21b serves as an exhaust passage.

Next, the oxidant supply device 30 will be described.

The oxidant supply device 30 includes an oxidant storage tank 31 in which the oxidant is stored at high pressure (e.g. 70 MPa), the oxidant supply unit 32 that supplies the high-pressure oxidant into the circulation passage 21, a high-pressure oxidant supply passage 33 that connects the oxidant storage tank 31 to the oxidant supply unit 32, a regulator 34 that is provided in the high-pressure oxidant supply passage 33, and an oxidant flowmeter 35. In the high-pressure oxidant supply passage 33, the regulator 34 is provided at a position upstream of the oxidant flowmeter 35 (the regulator 34 is closer to the oxidant storage tank 31 than the flowmeter 35).

In the first embodiment of the invention, the oxidant is mixed with the working gas in the circulation passage 21 and then supplied to the circulation passage 21, instead of being supplied alone to the circulation passage 21. Therefore, the oxidant supply unit 32 used in the first embodiment of the invention is an oxidant mixing unit that mixes the oxidant from the high-pressure oxidant supply passage 33 with the working gas from the circulation passage 21 and delivers the oxidant and the working gas from the outlet 32a to the circulation passage 21 at a portion that is downstream of the oxidant supply unit 32 (that is close to the intake port 11b). Therefore, the oxidant is supplied into the combustion chamber CC together with the working gas through the intake port 11b when the intake valve 15 is opened.

The regulator 34 regulates the pressure in the high-pressure oxidant supply passage 33 at a portion downstream of the regulator 34 (at a portion close to the oxidant flowmeter 35) to a target pressure according to a command from an electronic control unit (ECU) 50. In other words, the regulator 34 is used to control the flow rate of the oxidant in the high-pressure oxidant supply passage 33. The oxidant flowmeter 35 is a device that measures the flow rate of the oxidant in the high-pressure oxidant supply passage 33, which is regulated by the regulator 34. A signal indicating the result of measurement performed by the oxidant flowmeter 35 is transmitted to the electronic control unit 50.

In the first embodiment of the invention, oxygen ($O_2$) is used as the oxidant. Therefore, oxygen ($O_2$) is stored in the oxidant storage tank 31 at high pressure.

Next, the fuel supply device 40 will be described.

The fuel supply device 40 includes a fuel storage tank 41 in which the fuel is stored at high pressure (e.g. 70 Mpa), fuel injection devices 42 that inject the fuel and that are provided at respective cylinders, a first high-pressure fuel supply passage 43 through which the fuel in the fuel storage tank 41 is distributed to the cylinders, a second high-pressure fuel supply passage 44 that connects the fuel storage tank 41 to the first high-pressure fuel supply passage 43, a third high-pressure fuel supply passage 45 that connects the first high-pressure fuel supply passage 43 to the fuel injection devices 42, a regulator 46 that is provided in the second high-pressure fuel supply passage 44, a fuel flowmeter 47, and a surge tank 48. In the second high-pressure fuel supply passage 44, the regulator 46, the fuel flowmeter 47 and the surge tank 48 are provided in this order from the upstream side (fuel storage tank 41-side). The first high-pressure fuel supply passage 43, the second high-pressure fuel supply passage 44 and the third high-pressure fuel supply passage 45 may be defined by fuel delivery pipes.

In the first embodiment of the invention, each fuel injection device 42 is provided at the cylinder head 11 so that the fuel is injected directly into the combustion chamber CC. The fuel injection device 42 is a so-called fuel injection valve that is controlled by the electronic control unit 50. For example, the electronic control unit 50 controls the timing at which the fuel is injected and the injection amount of fuel based on the engine operating state, for example, the engine speed.

The regulator 46 regulates the pressure in the second high-pressure fuel supply passage 44 at a portion downstream of the regulator 46 (at a portion close to the fuel flowmeter 47 and the surge tank 48) to a prescribed pressure. In other words, the regulator 46 is used to control the flow rate of the fuel in the second high-pressure fuel supply passage 44. The fuel flowmeter 47 is a device that measures the flow rate of the fuel in the second high-pressure fuel supply passage 44, which is regulated by the regulator 46. A signal indicating the result of measurement performed by the fuel flowmeter 47 is transmitted to the electronic control unit 50. The surge tank 48 is used to reduce pulsations generated in the first high-pressure fuel supply passage 43, the second high-pressure fuel supply passage 44, and the third high-pressure fuel supply passage 45 when the fuel injection devices 42 inject the fuel.

In the first embodiment of the invention, hydrogen ($H_2$) is used as the fuel. Therefore, hydrogen ($H_2$) is stored in the fuel storage tank 41 at high pressure.

In the working gas circulation engine according to the first embodiment of the invention, hydrogen ($H_2$), used as the fuel, and oxygen ($O_2$), used as the oxidant, are supplied into the combustion chamber CC, and diffusion combustion of the hydrogen ($H_2$) is performed. Therefore, in this working gas circulation engine, high-pressure hydrogen ($H_2$) is injected into high-temperature compressed gas (oxygen ($O_2$) and argon (Ar)) formed in the combustion chamber CC, whereby part of the hydrogen ($H_2$) self-ignites. Then, the hydrogen ($H_2$) and the compressed gas (oxygen ($O_2$)) are burned while being diffusively mixed together. Due to the combustion of the hydrogen ($H_2$), the hydrogen ($H_2$) and the oxygen ($O_2$) bind together to form water vapor ($H_2O$) and thermal expansion of argon (Ar) that has high specific heat ratio takes place in the combustion chamber CC. Therefore, in the working gas circulation engine, the piston 13 is pushed down due to the diffusion combustion of hydrogen ($H_2$) and the thermal expansion of argon (Ar), whereby power is generated.

When the combustion of hydrogen ($H_2$) and the thermal expansion of argon (Ar) are completed (e.g. when the piston 13 is near the bottom dead center), the water vapor ($H_2O$) and the argon (Ar) are discharged from the combustion chamber CC into the exhaust port 11c when the exhaust valve 16 is opened. The discharged argon (Ar) needs to be circulated back to the combustion chamber CC through the circulation path 20 and the intake port 11b so that the thermal efficiency of the engine body 10 is enhanced. However, the water vapor ($H_2O$) that is discharged together with the argon (Ar) is triatomic, and has a specific heat ratio that is lower than that of the argon (Ar). Therefore, if the water vapor ($H_2O$) is circulated back to the combustion chamber CC together with the argon (Ar), the thermal efficiency of the engine body 10 may be reduced. Therefore, a device that removes the water vapor ($H_2O$) contained in the exhaust gas is provided in the circulation path 20.

As the device that removes the water vapor ($H_2O$), the condenser 60 shown in FIG. 1 is used. The condenser 60 is provided in the circulation passage 21 (at a position between the second circulation passage 21b and the third circulation passage 21c). With the condenser 60, the water vapor ($H_2O$) contained in the exhaust gas is liquefied and condensed, whereby the argon (Ar) and condensed water ($H_2O$) are separated from each other. A coolant is circulated in the condenser 60, and the water vapor ($H_2O$) is liquefied and condensed with the use of the coolant. The argon (Ar) that is separated from the condensed water ($H_2O$) is discharged to the third circulation passage 21c through the working gas outlet 60b. The condensed water ($H_2O$) is discharged to a condensed water passage 22 through a condensed water outlet 60c, and discharged to the outside of the working gas circulation engine.

The exhaust gas discharged from the combustion chamber CC may contain not only the water vapor ($H_2O$) and the argon (Ar) but also hydrogen ($H_2$) or oxygen ($O_2$). For example, when the amount of hydrogen ($H_2$) supplied to the combustion chamber CC is larger than the amount of oxygen ($O_2$) supplied to the combustion chamber CC, part of the hydrogen ($H_2$) is left unburned and the unburned hydrogen ($H_2$) is discharged to the circulation path 20. On the other hand, when the amount of oxygen ($O_2$) supplied to the combustion chamber CC is larger than the amount of hydrogen ($H_2$) supplied to the combustion chamber CC, part of the oxygen ($O_2$) is left unused and the unused oxygen ($O_2$) is discharged to the circulation path 20. The hydrogen ($H_2$) or the oxygen ($O_2$) in the exhaust gas is separated from the water vapor ($H_2O$) at the condenser 60, and discharged to the third circulation passage 21c together with the argon (Ar). Therefore, the hydrogen ($H_2$) or the oxygen ($O_2$) is also circulated back to the combustion chamber CC.

Therefore, in the working gas circulation engine, in order to prevent the amount of hydrogen ($H_2$) or oxygen ($O_2$) in the combustion chamber CC from being excessive, the amount of hydrogen ($H_2$) or the amount of oxygen ($O_2$) in the exhaust gas is determined, and the amount of hydrogen ($H_2$) that is injected from the fuel supply device 40 or the amount of oxygen ($O_2$) that is supplied from the oxidant supply device 30 is adjusted with the timing, at which the hydrogen ($H_2$) or the oxygen ($O_2$) reaches the combustion chamber CC, taken into account. In the first embodiment of the invention, a hydrogen concentration detection device (hydrogen concentration sensor 71) that detects the hydrogen concentration in the exhaust gas and an oxygen concentration detection device (oxygen concentration sensor 72) that detects the oxygen concentration in the exhaust gas are provided in the third circulation passage 21c of the circulation passage 21. Then, the hydrogen concentration sensor 71 and the oxygen concentration sensor 72 transmit signals indicating detection results to the electronic control unit 50. In this way, the electronic control unit 50 determines the amount of hydrogen ($H_2$) or oxygen ($O_2$) that remains in the exhaust gas based on the detection signal, and controls the amount of hydrogen ($H_2$) that is injected from the fuel injection device 42 or the target pressure for the regulator 34 (that is, the supply amount of oxygen ($O_2$)) with the timing at which the hydrogen ($H_2$) or the oxygen ($O_2$) reaches the combustion chamber CC taken into account.

The working gas circulation engine is a closed-cycle engine. Therefore, after the engine is stopped, the oxidant or the fuel remains in a supply path at high pressure and may leak into the circulation path 20 or the combustion chamber CC. More specifically, the oxidant remains in the high-pressure oxidant supply passage 33 or the oxidant supply unit 32 at high pressure, and may be pushed by the pressure in the high-pressure oxidant supply passage 33. In this case, the oxidant may leak from the oxidant supply unit 32 into the circulation path 20. The fuel remains in the first high-pressure fuel supply passage 43, the second high-pressure fuel supply passage 44, and the third high-pressure fuel supply passage 45 at high pressure, and may be pushed by the pressure in these passages. In this case, the fuel may leak from the fuel injection device 42 into the combustion chamber CC. As a result, when the engine is restarted, the amount of oxidant or the amount of fuel in the combustion chamber may be larger than a target supply amount. This may cause some inconveniences, for example, this may hinder proper combustion of the fuel.

Therefore, in the working gas circulation engine according to the first embodiment of the invention, the oxidant and the fuel, which remain in the supply passages at high pressure when the engine is stopped, are bled off from the oxidant supply unit 32 and the first, second and third high-pressure fuel supply passages 43, 44 and 45 into different locations, respectively. In this way, it is possible to prevent excess supply of, for example, the oxidant, which is likely to occur when the engine is restarted.

In this specification, "when the engine is stopped" mainly means "when the operation of the engine body 10 is being stopped" or "immediately after the operation of the engine body 10 is stopped". However, "when the engine is stopped" may mean any time point in a period in which the engine is stopped as long as leakage of the oxidant, etc. does not occur. In the first embodiment of the invention, hydrogen ($H_2$) is used as the fuel. Because the number of molecules of hydrogen ($H_2$) is small, leakage of the hydrogen ($H_2$) is more likely to occur as the pressure of the hydrogen ($H_2$) increases. Therefore, an example of the structure for preventing leakage of the fuel (hydrogen ($H_2$)) will be described below.

In the first embodiment of the invention, there is provided a fuel bleed-off system 80 that bleeds the high-pressure fuel off from at least one of the first, second, and third high-pressure fuel supply passages 43, 44 and 45 when the engine is stopped. Hereafter, description will be provided concerning the fuel bleed-off system 80, shown in FIG. 1, which bleeds the high-pressure fuel that remains in the first high-pressure fuel supply passage 43 off into a different location.

More specifically, the fuel bleed-off system 80 includes a fuel bleed-off tank 81 into which the high-pressure fuel that remains in the first high-pressure fuel supply passage 43 is bled off, a fuel bleed-off passage 82 that connects the fuel bleed-off tank 81 to the first high-pressure fuel supply passage 43, and a fuel bleed-off device 83 that is provided in the fuel bleed-off passage 82 and that shuts off or permits flow of fuel through the fuel bleed-off passage 82.

The pressure in the fuel bleed-off tank 81 is set to a pressure which is lower than the pressure in the first high-pressure fuel supply passage 43 when the engine is stopped, and at which the high-pressure fuel in the first high-pressure fuel supply passage 43 is bled off into the fuel bleed-off tank 81 when communication is provided between the fuel bleed-off tank 81 and the first high-pressure fuel supply passage 43.

The operation of the fuel bleed-off device 83 is controlled by a fuel bleed-off control unit of the electronic control unit 50. As the fuel bleed-off device 83, for example, an on-off valve (fuel bleed-off valve), which shuts off or permits flow of fuel through the fuel bleed-off passage 82 by operating a valve body thereof, may be used. The fuel bleed-off control unit closes the fuel bleed-off device 83 so that flow of fuel through the fuel bleed-off passage 82 is shut off during the operation of the engine, whereas, when the engine is stopped, the fuel bleed-off control unit opens the fuel bleed-off device 83 until the flow passage area of the fuel bleed-off passage 82 is increased to a required flow passage area that is equal to or smaller than the maximum flow passage area.

In this case, if the fuel bleed-off device 83 is kept open for an unnecessarily long time period, the pressure in the first high-pressure fuel supply passage 43 excessively decreases due to outflow of the fuel. If the pressure in the first high-pressure fuel supply passage 43 is equal to the pressure in the fuel bleed-off tank 81, the fuel no longer moves. If the fuel bleed-off device 83 is continuously kept open, the pressure in the first high-pressure fuel supply passage 43 is not sufficiently high when the engine is restarted. As a result, the fuel injection device 42 is not able to inject the fuel in an appropriate amount or at an appropriate pressure. Therefore, if the fuel bleed-off device 83 is kept open, the restarting performance of the engine remains at a low level until the pressure in the first high-pressure fuel supply passage 43 becomes sufficiently high. Therefore, the fuel bleed-off control unit fully closes the fuel bleed-off device 83 when a predetermined time period has elapsed after opening the fuel bleed-off device 83. The predetermined time period is, at the longest, a time period from when the fuel bleed-off device 83 is opened until when the pressure in the first high-pressure fuel supply passage 43 becomes equal to the pressure in the fuel bleed-off tank 81. The predetermined time period may be determined empirically or through simulation. The fuel bleed-off system 80 is an internal pressure adjustment system that decreases the pressure in the first high-pressure fuel supply passage 43 by bleeding the fuel off from the first high-pressure fuel supply passage 43.

If the flow passage area of the second high-pressure fuel supply passage 44 is reduced by the regulator 46, the high-pressure fuel remains in the second high-pressure fuel supply passage 44 at a portion that is downstream of the regulator 46 when the engine is stopped. The second high-pressure fuel supply passage 44 is located upstream of the first high-pressure fuel supply passage 43. Accordingly, when the fuel bleed-off device 83 is opened, the fuel that is present in the second high-pressure fuel supply passage 44 at the portion downstream of the regulator 46 may also be bled off into the fuel bleed-off tank 81. However, if this fuel is also bled off into the fuel bleed-off tank 81, it takes long to increase the pressure in the first high-pressure fuel supply passage 43 to a sufficiently high pressure when the engine is restarted. Therefore, the fuel injection device 42 is not able to inject the fuel in an appropriate manner until the pressure in the first high-pressure fuel supply passage 43 becomes sufficiently high. As a result, the restarting performance of the engine deteriorates. Therefore, in the first embodiment of the invention, a fuel supply control device 84, which shuts off or permits flow of fuel through the second high-pressure fuel supply passage 44, is provided in the second high-pressure fuel supply passage 44 (preferably, at a position as close as possible to the first high-pressure fuel supply passage 43) in order to prevent the fuel from flowing from the second high-pressure fuel supply passage 44 into the first high-pressure fuel supply passage 43 when the engine is stopped. The operation of the fuel supply control device 84 is controlled by the fuel bleed-off control unit of the electronic control unit 50. As the fuel supply control device 84, for example, an on-off valve (fuel supply control valve), which shuts off or permits flow of fuel through the second high-pressure fuel supply passage 44 by operating a valve body thereof, may be used. The fuel bleed-off control unit opens the fuel supply control device 84 so that the flow passage area of the second high-pressure fuel supply passage 44 is the maximum flow passage area during the operation of the engine, whereas the fuel bleed-off control unit closes the fuel supply control device 84 so that the flow of fuel through the second high-pressure fuel supply passage 44 is shut off when the engine is stopped.

Figure 3:
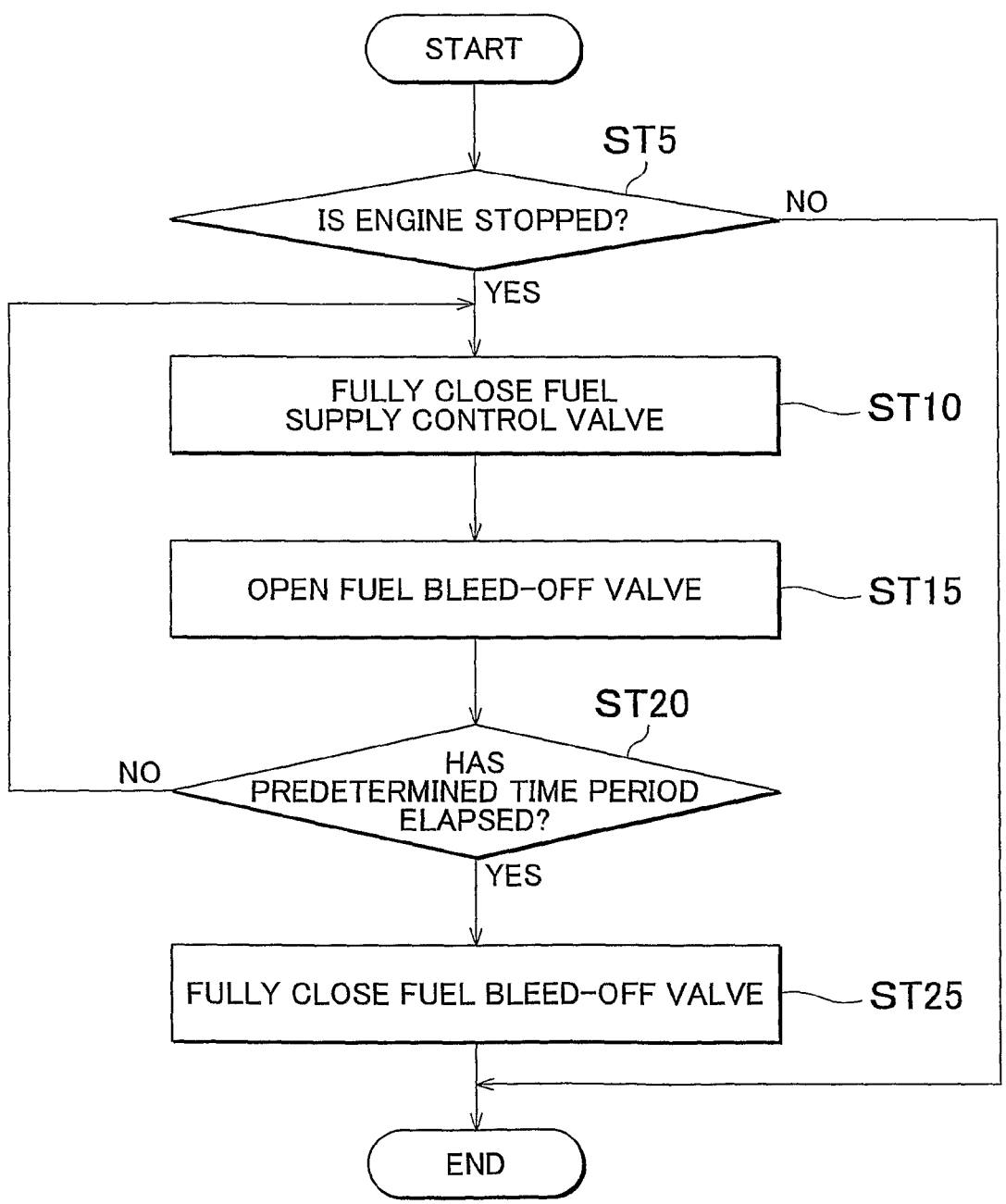
FIG. 3 is a flowchart showing fuel bleed-off control according to the first embodiment of the invention.

Hereafter, fuel bleed-off control according to the first embodiment of the invention will be described with reference to a flowchart in FIG. 3.

First, the fuel bleed-off control unit of the electronic control unit 50 determines whether the engine is stopped (step (hereinafter, referred to as "ST") 5). Such a determination may be made based on, for example, an engine stop command from a combustion control unit of the electronic control unit 50.

If it is determined in ST5 that the engine is not stopped, the fuel bleed-off control unit ends the routine.

On the other hand, if it is determined in ST5 that the engine is stopped, the fuel bleed-off control unit fully closes the fuel supply control device (fuel supply control valve) 84 in order to shut off flow of fuel through the second high-pressure fuel supply passage 44 that is located upstream of the first high-pressure fuel supply passage 43 (ST10). Then, the fuel bleed-off control unit opens the fuel bleed-off device (fuel bleed-off valve) 83 until the opening amount of the fuel bleed-off device 83 is increased to a required opening amount that is equal to or smaller than the maximum opening amount (ST15). Thus, communication is provided between the first high-pressure fuel supply passage 43 and the fuel bleed-off tank 81, and the high-pressure fuel in the first high-pressure fuel supply passage 43 is bled off into the fuel bleed-off tank 81 having an internal pressure lower than the pressure in the first high-pressure fuel supply passage 43. Accordingly, the pressure in the first high-pressure fuel supply passage 43 decreases.

Next, the fuel bleed-off control unit determines whether the above-mentioned predetermined time period has elapsed (ST20).

If it is determined that the predetermined time period has not elapsed, the fuel bleed-off control unit executes ST10 again to continue the fuel bleed-off control.

On the other hand, if it is determined that the predetermined time period has elapsed, the fuel bleed-off control unit fully closes the fuel bleed-off device 83 (ST25). Thus, communication between the first high-pressure fuel supply passage 43 and the fuel bleed-off tank 81 is shut off, after which fuel bleed-off control ends.

The fuel supply control device 84 is not opened when the fuel bleed-off control ends, and is kept closed until the engine is restarted. This is because, if the fuel supply control device 84 is opened before the engine is restarted, the fuel is supplied to the first high-pressure fuel supply passage 43 again and the pressure in the first high-pressure fuel supply passage 43 increases although the pressure in the first high-pressure fuel supply passage 43 has been decreased by bleeding the fuel off into the fuel bleed-off tank 81.

The fuel bleed-off tank 81 has a limited capacity. Therefore, if the fuel bleed-off tank 81 is full of the fuel, it is no longer possible to bleed the fuel off from the first high-pressure fuel supply passage 43 into the fuel bleed-off tank 81. Also, leaving the fuel in the fuel bleed-off tank 81 leads to waste of fuel.

Therefore, the fuel in the fuel bleed-off tank 81 is returned to the intake passage after the engine is restarted. Then, the fuel is burned in the combustion chamber CC.

More specifically, there are provided a bled-off fuel supply passage 91 that connects the fuel bleed-off tank 81 to the intake passage (first circulation passage 21a), and a bled-off fuel supply device 92 that is provided in the bled-off fuel supply passage 91 and that shuts off or permits flow of fuel through the bled-off fuel supply passage 91.

The operation of the bled-off fuel supply device 92 is controlled by a bled-off fuel control unit of the electronic control unit 50. As the bled-off fuel supply device 92, for example, an on-off valve (bled-off fuel supply valve), which shuts off or permits flow of fuel through the bled-off fuel supply passage 91 by operating a valve body thereof, may be used. The bled-off fuel control unit opens the bled-off fuel supply device 92 until the flow passage area of the bled-off fuel supply passage 91 is increased to a required flow passage area that is equal to or smaller than the maximum flow passage area under a predetermined condition during the operation of the engine, whereas the bled-off fuel control unit fully closes the bled-off fuel supply device 92 to shut off flow of fuel through the bled-off fuel supply passage 91 when the engine is stopped.

The bled-off fuel control unit keeps the bled-off fuel supply device 92 open until the pressure in the fuel bleed-off tank 81 falls below a predetermined pressure. Accordingly, the fuel bleed-off tank 81 is provided with a pressure detection device (pressure sensor) 93 that detects the pressure in the fuel bleed-off tank 81. The predetermined pressure is set to a value which is lower than the pressure in the first high-pressure fuel supply passage 43 when the engine is stopped, and at which the fuel in the first high-pressure fuel supply passage 43 is bled off into the fuel bleed-off tank 81 when the engine is stopped next time.

Figure 4:
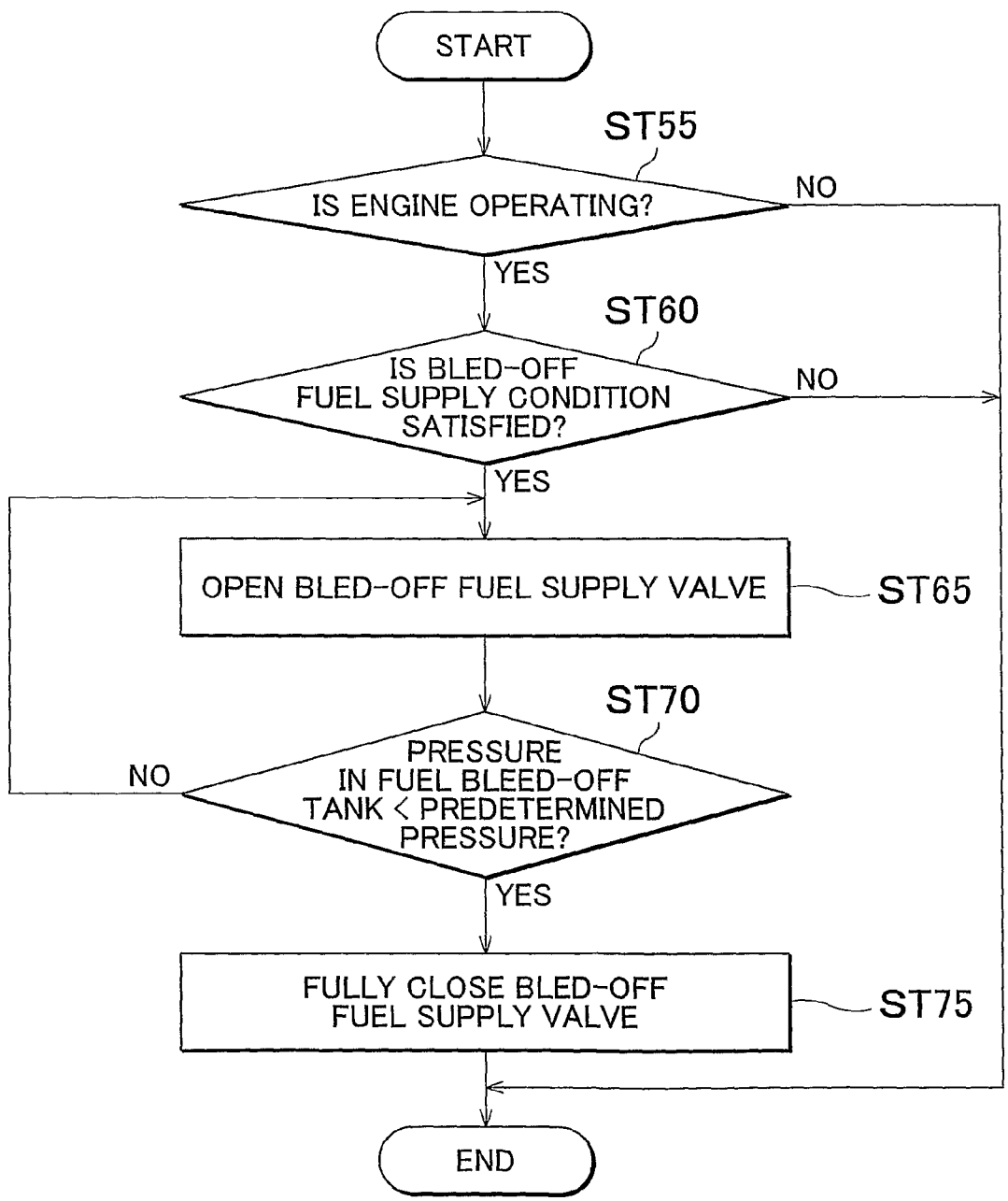
FIG. 4 is a flowchart showing bled-off fuel supply control according to the first embodiment of the invention.

Hereafter, bled-off fuel supply control according to the first embodiment of the invention will be described with reference to a flowchart in FIG. 4.

First, the bled-off fuel control unit of the electronic control unit 50 determines whether the engine is being operated (ST55).

If it is determined in ST 55 that the engine is not being operated, the bled-off fuel control unit ends the bled-off fuel supply control.

On the other hand, if it is determined in ST55 that the engine is being operated, the bled-off fuel control unit determines whether a bled-off fuel supply condition is satisfied (ST60).

The bled-off fuel supply condition may be, for example, a condition that the pressure in the fuel bleed-off tank 81 is increased to a pressure at which the fuel is no longer bled off into the fuel bleed-off tank 81. For example, the pressure may be a value that is equal to or slightly lower than the pressure in the first high-pressure fuel supply passage 43 when the engine is stopped. This value is set as a threshold value. In this case, in ST60, the bled-off fuel control unit compares a value detected by the pressure detection device 93 (pressure in the fuel bleed-off tank 81) with the predetermined threshold value. If the pressure in the fuel bleed-off tank 81 is lower than the threshold value, it is determined that the bled-off fuel supply condition is not satisfied. On the other hand, if the pressure in the fuel bleed-off tank 81 is equal to or higher than the threshold value, it is determined that the bled-off fuel supply condition is satisfied.

If it is determined in ST60 that the bled-off fuel supply condition is not satisfied, the bled-off fuel control unit ends the bled-off fuel supply control.

On the other hand, if it is determined in ST60 that the bled-off fuel supply condition is satisfied, the bled-off fuel control unit opens the bled-off fuel supply device (bled-off fuel supply valve) 92 until the opening amount of the bled-off fuel supply device 92 is increased to a required opening amount that is equal to or smaller than the maximum opening amount (ST65). Thus, the fuel (hydrogen (H$_2$)) in the fuel bled-off tank 81 is supplied to the intake passage (first circulation passage 21a), and taken in the combustion chamber CC along with argon (Ar) and oxygen (O$_2$) when the intake valve 15 is opened. In this case, preferably, the amount of fuel injected from the fuel injection device 42 is reduced by an amount of fuel that is supplied from the fuel bleed-off tank 81.

Next, the bled-off fuel control unit determines whether the pressure in the fuel bleed-off tank 81 is lower than the above-described predetermined pressure (ST70).

Then, if it is determined that the pressure in the fuel bleed-off tank 81 is not lower than the predetermined pressure, the bled-off fuel control unit executes ST65 again to continue the bled-off fuel supply control.

On the other hand, if it is determined in ST70 that the pressure in the fuel bleed-off tank 81 is lower than the above-described predetermined pressure, the bled-off fuel control unit fully closes the bled-off fuel supply device 92 in order to shut off communication between the fuel bleed-off tank 81 and the intake passage (ST75). Then, the bled-off fuel supply control ends.

In the working gas circulation engine according to the first embodiment of the invention described above, the fuel in the first high-pressure fuel supply passage 43 is bled off into the fuel bleed-off tank 81 when the engine is stopped. Therefore, the pressure in the first high-pressure fuel supply passage 43 after the engine is stopped is kept low. Therefore, in the working gas circulation engine, it is possible to prevent occurrence of the situation that the fuel is pushed by the pressure in the first high-pressure fuel supply passage 43 and leaks from the fuel injection device 42 into the combustion chamber CC. Therefore, in the working gas circulation engine, the fuel is not excessively supplied into the combustion chamber CC when the engine is restarted. As a result, the fuel is burned in the combustion chamber CC in an appropriate manner. In the working gas circulation engine, the fuel that is bled off into the fuel bleed-off tank 81 is supplied to the intake passage during the operation of the engine, and the fuel is burned in the combustion chamber CC. As a result, it is possible to prevent waste of the fuel.

Figure 7:
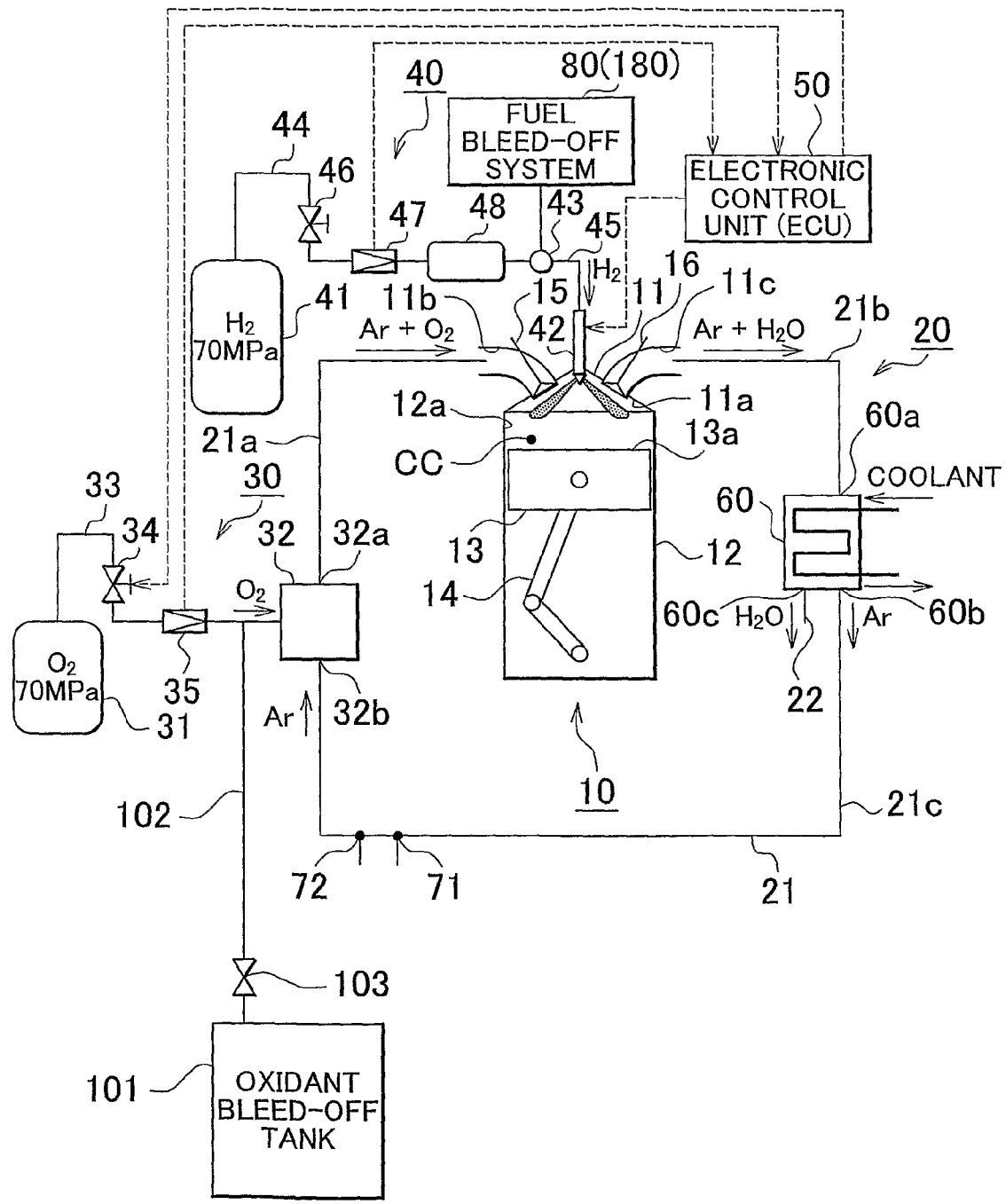
FIG. 7 is a view showing the overall structure of a gas circulation engine including an oxidant bleed-off tank according to embodiments of the invention.
Figure 8:
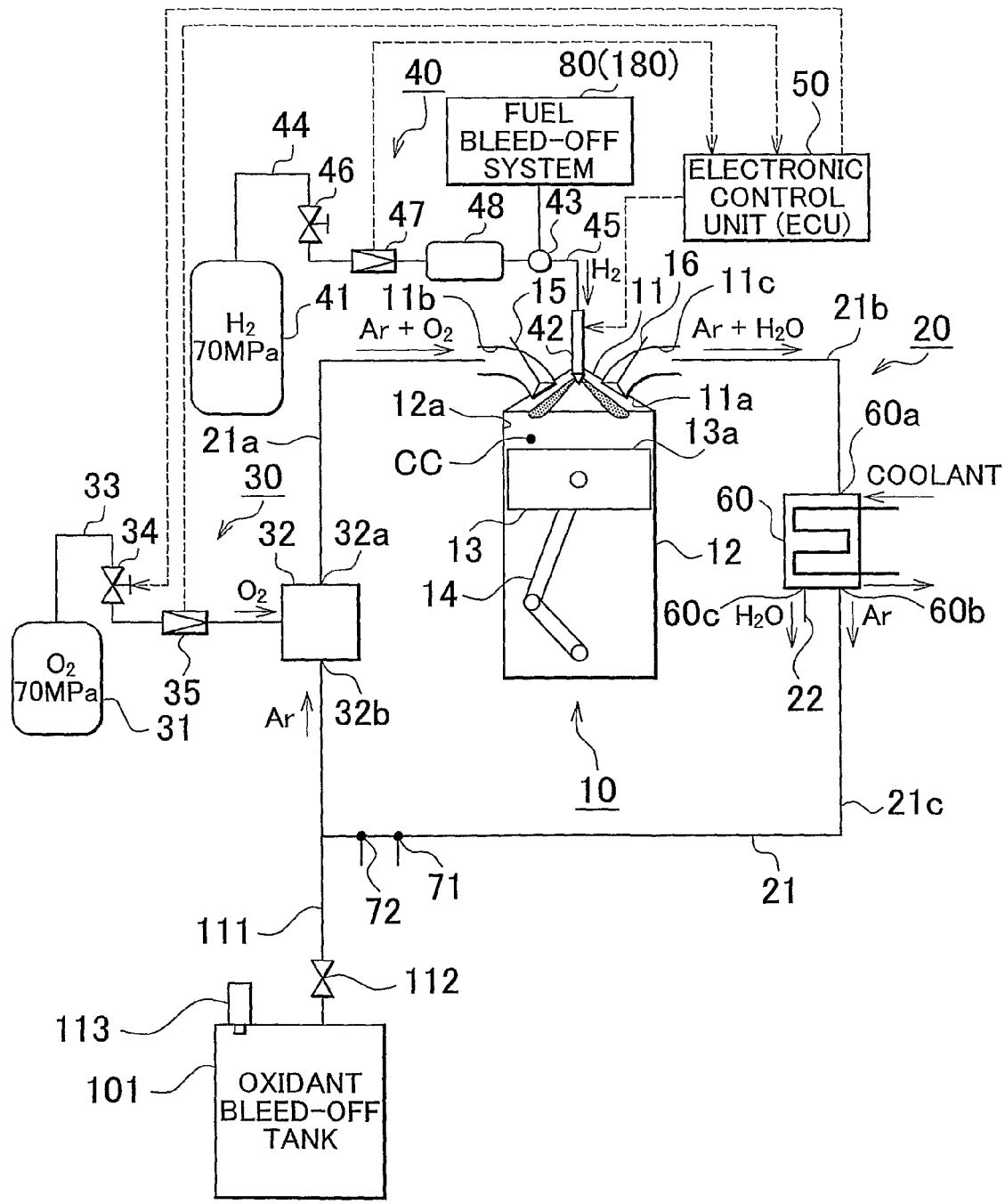
FIG. 8 is a view showing the overall structure of a gas circulation engine including an oxidant bleed-off tank with a pressure detection device according to embodiments of the invention.

Next, with reference to FIG. 7, and FIG. 8, a brief description will be provided concerning an oxidant bleed-off system that bleeds the high-pressure oxidant, which remains in the high-pressure oxidant supply passage 33, off into a different location when the engine is stopped.

The oxidant bleed-off system includes an oxidant bleed-off tank 101 into which the high-pressure oxidant that remains in the high-pressure oxidant supply passage 33 is bled off, an oxidant bleed-off passage 102 that connects the oxidant bleed-off tank 101 to the high-pressure oxidant supply passage 33, and an oxidant bleed-off device 103 that is provided in the oxidant bleed-off passage 102 and that shuts off or permits flow of oxidant through the oxidant bleed-off passage 102. In addition, an oxidant supply control device (oxidant supply control valve), which is similar to the fuel supply control device 84, is provided in the high-pressure oxidant supply passage 33 at a position upstream of the position at which the high-pressure oxidant supply passage 33 is connected to the oxidant bleed-off passage 102.

As is the case of the fuel bleed-off tank 81, the pressure in the oxidant bleed-off tank 101 is set to a pressure which is lower than the pressure in the high-pressure oxidant supply passage 33 when the engine is stopped, and at which the high-pressure oxidant in the high-pressure oxidant supply passage 33 is bled off into the oxidant bleed-off tank 101 when communication is provided between the oxidant bleed-off tank 101 and the high-pressure oxidant supply passage 33.

As in the case of the fuel bleed-off device 83, the operation of the oxidant bleed-off device 103 is controlled by an oxidant bleed-off control unit of the electronic control unit 50. As the oxidant bleed-off device 103, for example, an on-off valve (oxidant bleed-off valve), which shuts off or permits flow of oxidant through the oxidant bleed-off passage 102 by operating a valve body thereof, may be used. The oxidant bleed-off control unit opens the oxidant bleed-off device 103 until the opening amount of the oxidant bleed-off device 103 is increased to a required opening amount that is equal to or smaller than the maximum opening amount when the engine is stopped.

In the oxidant bleed-off system, the oxidant supply control device is fully closed and the oxidant bleed-off device 103 is opened by the oxidant bleed-off control unit when the engine is stopped. Thus, the oxidant in the high-pressure oxidant supply passage 33 is bled off into the oxidant bleed-off tank 101 to decrease the pressure in the high-pressure oxidant supply passage 33. The oxidant bleed-off control unit fully closes the oxidant bleed-off device 103 when a predetermined time period has elapsed after the oxidant bleed-off device 103 is opened. The predetermined time period is, at the longest, a time period from when the oxidant bleed-off device 103 is opened until when the pressure in the high-pressure oxidant supply passage 33 becomes equal to the pressure in the oxidant bleed-off tank 101. As in the case of the fuel bleed-off system 80, the predetermined time period may be determined empirically or through simulation.

In the working gas circulation engine according to the first embodiment of the invention, the oxidant in the high-pressure oxidant supply passage 33 is bled off into the oxidant bleed-off tank 101 when the engine is stopped. Accordingly, the pressure in the high-pressure oxidant supply passage 33 after the engine is stopped is kept low. Therefore, in the working gas circulation engine, it is possible to prevent occurrence of the situation where the oxidant is pushed by the pressure in the high-pressure oxidant supply passage 33 and leaks from the oxidant supply unit 32 into the circulation path 20. Accordingly, in the working gas circulation engine, the oxidant is not excessively supplied into the combustion chamber CC when the engine is restarted. As a result, the fuel is burned in the combustion chamber CC in an appropriate manner.

In this case, the oxidant that is bled off into the oxidant bleed-off tank 101 may be supplied to the intake passage after the engine is restarted. In this case, there are provided a bled-off oxidant supply passage 111 that connects the oxidant bleed-off tank 101 to the intake passage (the first circulation passage 21a or the third circulation passage 21c at a portion close to the first circulation passage 21a), and a bled-off oxidant supply device 112 that is provided in the bled-off oxidant supply passage 111 and that shuts off or permits flow of oxidant through the bled-off oxidant supply passage 111.

The operation of the bled-off oxidant supply device 112 is controlled by a bled-off oxidant control unit of the electronic control unit 50. As the bled-off oxidant supply device 112, for example, an on-off valve (bled-off oxidant supply valve), which shuts off or permits flow of oxidant through the bled-off oxidant supply passage 111 by operating a valve body thereof, may be used. The bled-off oxidant control unit opens the bled-off oxidant supply device 112 until the flow passage area of the bled-off oxidant supply passage 111 is increased to a required flow passage area that is equal to or smaller than the maximum flow passage area during the operation of the engine. The bled-off oxidant control unit keeps the bled-off oxidant supply device 112 open until the pressure in the oxidant bleed-off tank 101 falls below a predetermined pressure. Accordingly, the oxidant bleed-off tank 101 is provided with a pressure detection device (pressure sensor) 113, as shown in FIG. 8, that detects the pressure in the oxidant bleed-off tank 101. The predetermined pressure is a pressure which is lower than the pressure in the high-pressure oxidant supply passage 33 when the engine is stopped, and at which the oxidant in the high-pressure oxidant supply passage 33 is bled off into the oxidant bleed-off tank 101 when the engine is stopped next time.

Both the fuel bleed-off system 80 and the oxidant bleed-off system according to the first embodiment of the invention may be provided in one working gas circulation engine. In this case, the fuel is burned in the combustion chamber CC of the working gas circulation engine in a more appropriate manner due to the synergistic effects created by these systems.

Figure 5:
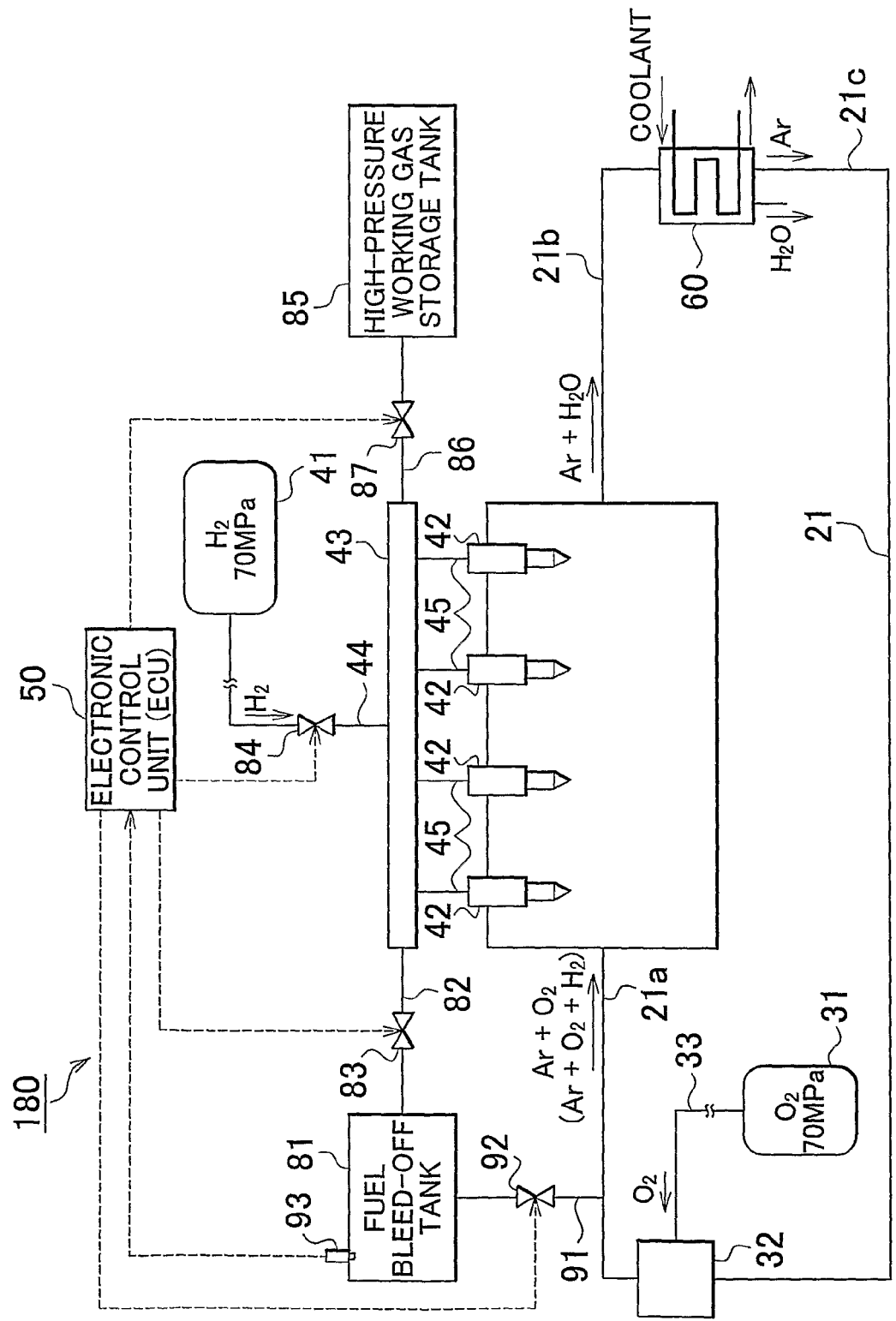
FIG. 5 is a view showing the structure of a gas circulation engine according to a second embodiment of the invention.
Figure 6:
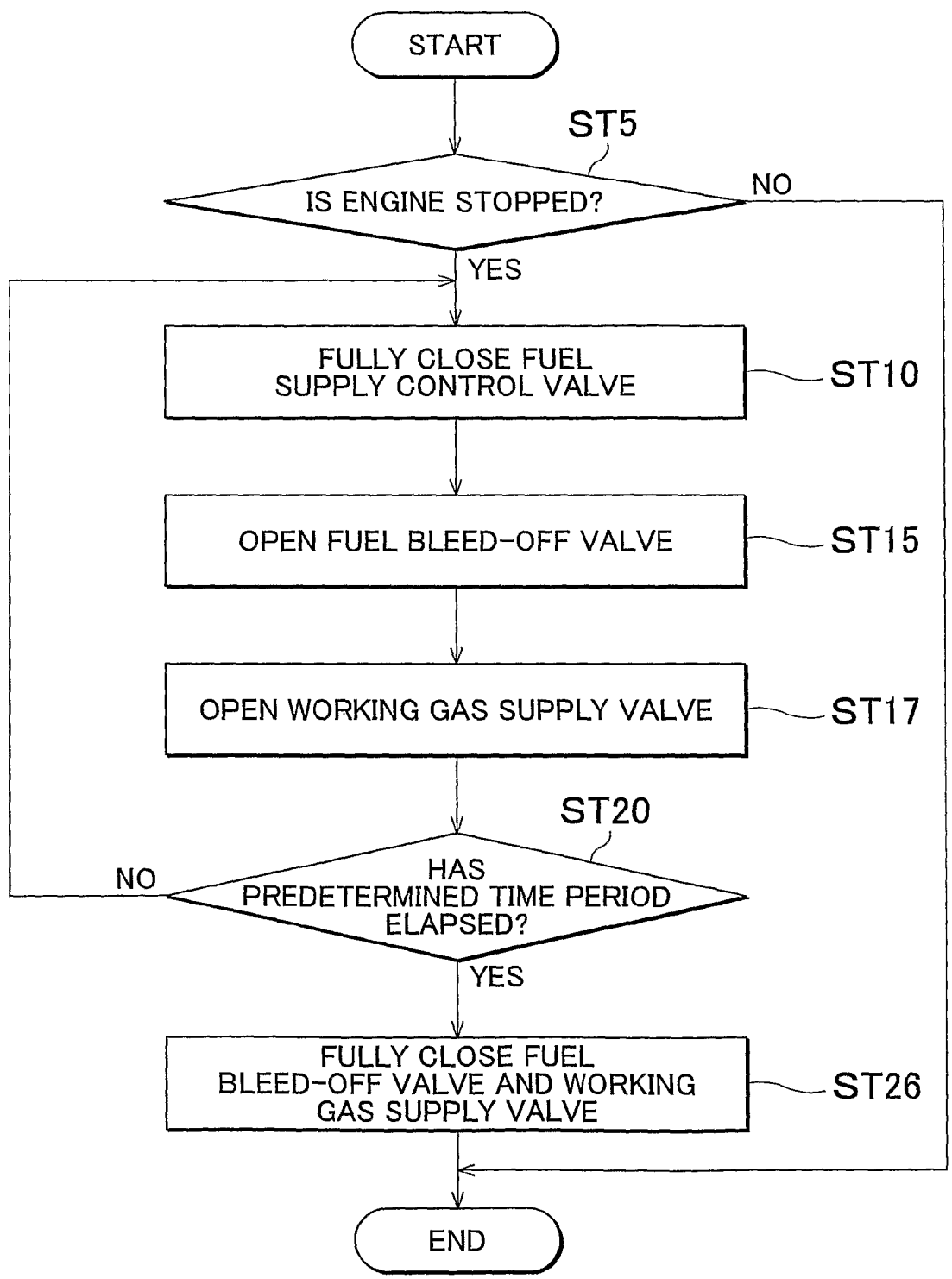
FIG. 6 is a flowchart showing fuel bleed-off control according to the second embodiment of the invention.

Next, a working gas circulation engine according to a second embodiment of the invention will be described with reference to FIGS. 5 and 6.

The working gas circulation engine according to the second embodiment of the invention is the same as the working gas circulation engine according to the first embodiment except that a fuel bleed-off system 180 is used instead of the fuel bleed-off system 80.

The fuel bleed-off system 80 according to the first embodiment of the invention bleeds the fuel in the first high-pressure fuel supply passage 43 off into the fuel bleed-off tank 81 using the difference between the pressure in the first high-pressure fuel supply passage 43 and the pressure in the fuel bleed-off tank 81. Therefore, when the pressure in the fuel bleed-off tank 81 is too high, the fuel is not bled off into the fuel bleed-off tank 81, which makes it difficult to decrease the pressure in the first high-pressure fuel supply passage 43.

Therefore, according to the second embodiment of the invention, the fuel bleed-off system 180 is structured in such a manner that the fuel in the first high-pressure fuel supply passage 43 is forcibly bled off into the fuel bleed-off tank 81.

The fuel bleed-off system 180 according to the second embodiment of the invention is formed by endowing the fuel bleed-off system 80 according to the first embodiment of the invention with the function of forcibly bleeding the fuel off into the fuel bleed-off tank 81. To provide the function of forcibly bleeding the fuel off into the fuel bleed-off tank 81, there are provided a high-pressure working gas storage tank 85 in which the working gas is stored at high pressure, a working gas supply passage 86 that connects the high-pressure working gas storage tank 85 to the first high-pressure fuel supply passage 43, and a working gas supply device 87 that is provided in the working gas supply passage 86 and that shuts off or permits flow of working gas through the working gas supply passage 86.

The high-pressure working gas storage tank 85 stores the working gas at a pressure that is higher than the pressure in the first high-pressure fuel supply passage 43 when the engine is stopped. The working gas stored in the high-pressure working gas storage tank 85 is the same as the working gas that circulates through the circulation path 20. Therefore, even if the working gas in the high-pressure working gas storage tank 85 is supplied to the combustion chamber CC, negative influence is not exerted on the thermal expansion of the working gas.

The operation of the working gas supply device 87 is controlled by the fuel bleed-off control unit of the electronic control unit 50. As the working gas supply device 87, for example, an on-off valve (working gas supply valve), which shuts off or permits flow of working gas through the working gas supply passage 86 by operating a valve body thereof, may be used. The fuel bleed-off control unit shuts off flow of working gas through the working gas supply passage 86 by fully closing the working gas supply device 87 during the operation of the engine, whereas the fuel bleed-off control unit opens the working gas supply device 87 until the flow passage area of the working gas supply passage 86 is increased to a required flow passage area that is equal to or smaller than the maximum flow passage area when the engine is stopped.

In the second embodiment of the invention, the fuel bleed-off system 180 is structured in such a manner that the function of forcibly bleeding the fuel off into the fuel bleed-off tank is provided. With this structure, the working gas from the high-pressure working gas storage tank 85 pushes the fuel out of the first high-pressure fuel supply passage 43 so that the fuel is bled off into the fuel bleed-off tank 81. Also, it is possible to reduce the concentration of the fuel in the first high-pressure fuel supply passage 43 by executing the control for forcibly bleeding the fuel off into the fuel bleed-off tank 81.

Hereafter, fuel bleed-off control according to the second embodiment of the invention will be described with reference to a flowchart in FIG. 6.

As in the first embodiment of the invention, the fuel bleed-off control unit of the electronic control unit 50 first determines whether the engine is stopped (ST5). If it is determined that the engine is stopped, the fuel bleed-off control unit fully closes the fuel supply Control device (fuel supply control valve) 84 (ST10), and opens the fuel bleed-off device (fuel bleed-off valve) 83 until the opening amount of the fuel bleed-off device 83 is increased to a required opening amount that is equal to or smaller than the maximum opening amount (ST15). Thus, in the working gas circulation engine, flow of fuel through the second high-pressure fuel supply passage 44, which is located upstream of the first high-pressure fuel supply passage 43, is shut off, and communication is provided between the first high-pressure fuel supply passage 43 and the fuel bleed-off tank 81.

In this case, according to the second embodiment of the invention, the fuel bleed-off control unit opens the working gas supply device (working gas supply valve) 87 until the opening amount of the working gas supply device 87 is increased to a required opening amount that is equal to or smaller than the maximum opening amount (ST17). Thus, communication is provided between the high-pressure working gas storage tank 85 and the first high-pressure fuel supply passage 43. At this time, the high-pressure working gas flows from the high-pressure working gas storage tank 85 into the first high-pressure fuel supply passage 43. Therefore, the working gas pushes the fuel in the first high-pressure fuel supply passage 43 into the fuel bleed-off tank 81.

Next, the fuel bleed-off control unit determines whether a predetermined time period has elapsed after the working gas supply device 87 is opened (ST20). The predetermined time period in the second embodiment of the invention may be set to a time period from when the working gas supply device 87 is opened until when the content in the first high-pressure fuel supply passage 43 is switched from the fuel to the working gas. The predetermined time period may be determined empirically or through simulation.

If it is determined that the predetermined time period has not elapsed, the fuel bleed-off control unit executes ST10 again to continue the fuel bleed-off control.

On the other hand, if it is determined that the predetermined time period has elapsed, the fuel bleed-off control unit fully closes the fuel bleed-off device 83 and the working gas supply device 87 (ST26). Thus, communication between the first high-pressure fuel supply passage 43 and the fuel bleed-off tank 81 and communication between the first high-pressure fuel supply passage 43 and the high-pressure working gas storage tank 85 are shut off, after which the fuel bleed-off control ends.

As in the first embodiment of the invention, the fuel bleed-off device 84 is not opened when the fuel bleed-off control ends, and kept closed until the engine is restarted.

In the second embodiment of the invention as well, there are provided the bled-off fuel supply passage 91 that connects the fuel bleed-off tank 81 to the intake passage (first circulation passage 21a), and the bled-off fuel supply device 92 that is provided in the bled-off fuel supply passage 91 and that shuts off or permits flow of fuel through the bled-off fuel supply passage 91. Therefore, the fuel in the fuel bleed-off tank 81 is returned to the intake passage after the engine is restarted. Then, the fuel is burned in the combustion chamber CC.

As described above, in the working gas circulation engine according to the second embodiment of the invention, the fuel in the first high-pressure fuel supply passage 43 is forcibly bled off into the fuel bleed-off tank 81 when the engine is stopped. Therefore, in the working gas circulation engine, it is possible to prevent occurrence of the situation where the fuel is pushed by the pressure in the first high-pressure fuel supply passage 43 and leaks from the fuel injection device 42 into the combustion chamber CC. Accordingly, in the working gas circulation engine, the fuel is not excessively supplied into the combustion chamber CC when the engine is restarted. As a result, the fuel is burned in the combustion chamber CC in an appropriate manner. In addition, in the working gas circulation engine, the content in the first high-pressure fuel supply passage 43 may be switched from the fuel to the working gas. In the working gas circulation engine, the fuel bled off into the fuel bleed-off tank 81 is supplied to the intake passage during the operation of the engine, and the fuel is burned in the combustion chamber CC. Therefore, it is possible to prevent waste of the fuel.

Next, a brief description will be provided concerning an oxidant bleed-off system that bleeds the high-pressure oxidant, which remains in the high-pressure oxidant supply passage 33, off into a different location when the engine is stopped. Note that the oxidant bleed-off system is not shown in the drawings because the structure of the oxidant bleed-off system is similar to the structure of the fuel bleed-off system 180.

The oxidant bleed-off system according to the second embodiment of the invention is formed by endowing the oxidant bleed-off system according to the first embodiment of the invention with the function of forcibly bleeding the oxidant off into the oxidant bleed-off tank 101. To provide the function of forcibly bleeding the oxidant off into the oxidant bleed-off tank 101, the high-pressure working gas storage tank 85, the working gas supply passage 86 and the working gas supply device 87 are connected to the high-pressure oxidant supply passage 33. Unlike in the fuel bleed-off system 180, in this oxidant bleed-off system, one end of the working gas supply passage 86 is connected to the high-pressure oxidant supply passage 33, and communication is provided between the high-pressure working gas storage tank 85 and the high-pressure oxidant supply passage 33 when the working gas supply device 87 is opened. Accordingly, in the oxidant bleed-off system, the oxidant in the high-pressure oxidant supply passage 33 is forcibly bled off into the oxidant bleed-off tank 101 by introducing the working gas into the high-pressure oxidant supply passage 33. As a result, it is possible to appropriately prevent leakage of the oxidant into the circulation path 20 when the engine is stopped.

In the first and second embodiments of the invention described above, the fuel injection device 42 is provided in such a manner that the fuel is injected directly into the combustion chamber CC. Alternatively, the fuel injection device 42 may be fitted to the cylinder head 11 so that the fuel is injected into the intake port 11b. That is, the first and second embodiments of the invention may be applied to a working gas circulation engine of a so-called port injection type. In this case, it is possible to obtain the effects that are the same as those in the first and second embodiments of the invention.

In the working gas circulation engine according to the first and second embodiments of the invention, diffuse combustion of hydrogen ($H_2$), used as fuel, is performed. Alternatively, the fuel may be ignited by a spark plug (not shown) and so-called spark ignition combustion may be performed. Further alternatively, a spark plug may be used to assist ignition and diffuse combustion may be performed. In various working gas circulation engines that differ in combustion manner, it is possible to obtain the effects that are the same as those in the first and second embodiments of the invention.

In the gas circulation engine, there is a possibility that, even if the working gas is not present in the circulation path 20, the high-pressure oxidant or the high-pressure fuel in the supply path may leak into the circulation path 20 or the combustion chamber CC when the engine is stopped. Therefore, the first and second embodiments of the invention may be applied to a gas circulation engine in which the working gas is not present in the circulation path 20. In this case, it is possible to obtain the effects that are the same as those described above.

As described above, the gas circulation engines according to the embodiments of the invention are useful to prevent excess supply of fuel, etc. when the engine is restarted.

The invention claimed is:

1. A gas circulation engine, comprising:
   a combustion chamber to which high-pressure fuel in a first high-pressure fuel supply passage and working gas that generates power with use of the combustion of the fuel and that has a specific heat ratio higher than a specific heat ratio of air are supplied;
   a circulation path that connects an intake-side portion and an exhaust-side portion of the combustion chamber to each other in such a manner that the working gas discharged from the combustion chamber is circulated back to the combustion chamber without being discharged into an atmosphere;
   a fuel bleed-off tank into which the high-pressure fuel in the first high-pressure fuel supply passage is bled off;
   a fuel bleed-off valve that permits or shuts off communication between the first high-pressure fuel supply passage and the fuel bleed-off tank;
   a fuel bleed-off control unit that permits communication between the first high-pressure fuel supply passage and the fuel bleed-off tank by opening the fuel bleed-off valve when the engine is stopped, the communication between the first high-pressure fuel supply passage and the fuel bleed-off tank being shut off during operation of the engine;

a high-pressure working gas storage tank in which the working gas is stored at a pressure that is higher than a pressure of the fuel in the first high-pressure fuel supply passage; and a working gas supply valve that permits or shuts off communication between the high-pressure working gas storage tank and the first high-pressure fuel supply passage, wherein the fuel bleed-off control unit opens the working gas supply valve when the engine is stopped.

2. The gas circulation engine according to claim 1, further comprising:

a bled-off fuel supply valve that permits or shuts off communication between the fuel bleed-off tank and an intake passage; and a bled-off fuel control unit that permits communication between the fuel bleed-off tank and the intake passage by opening the bled-off fuel supply valve after the engine is restarted, the communication between the fuel bleed-off tank and the intake passage being shut off when the engine is stopped.

3. The gas circulation engine according to claim 1, wherein the fuel bleed-off control unit closes the fuel bleed-off valve after a predetermined time period has elapsed after the fuel bleed-off valve is opened.

4. The gas circulation engine according to claim 1, further comprising:

a fuel supply control valve that is provided in a second high-pressure fuel supply passage which is located upstream of the first high-pressure fuel supply passage, wherein the fuel bleed-off control unit opens the fuel supply control valve during operation of the engine, closes the fuel supply control valve when the engine is stopped, and keeps the fuel supply control valve closed until the engine is restarted.

5. The gas circulation engine according to claim 1, wherein:

an oxidant that promotes combustion of the fuel is supplied to the combustion chamber; and the gas circulation engine further comprises an oxidant bleed-off tank into which the high-pressure oxidant in a high-pressure oxidant supply passage is bled off;

an oxidant bleed-off valve that permits or shuts off communication between the high-pressure oxidant supply passage and the oxidant bleed-off tank; and an oxidant bleed-off control unit that permits communication between the high-pressure oxidant supply passage and the oxidant bleed-off tank by opening the oxidant bleed-off valve when the engine is stopped, the communication between the high-pressure oxidant supply passage and the oxidant bleed-off tank being shut off during operation of the engine.

6. A gas circulation engine, comprising:

a combustion chamber to which high-pressure fuel in a first high-pressure fuel supply passage is supplied;

a circulation path that connects an intake-side portion and an exhaust-side portion of the combustion chamber to each other;

a fuel bleed-off tank into which the high-pressure fuel in the first high-pressure fuel supply passage is bled off;

a fuel bleed-off valve that permits or shuts off communication between the first high-pressure fuel supply passage and the fuel bleed-off tank;

a fuel bleed-off control unit that permits communication between the first high-pressure fuel supply passage and the fuel bleed-off tank by opening the fuel bleed-off valve when the engine is stopped, the communication between the first high-pressure fuel supply passage and the fuel bleed-off tank being shut off during operation of the engine;

a bled-off fuel supply valve that permits or shuts off communication between the fuel bleed-off tank and an intake passage; and a bled-off fuel control unit that permits communication between the fuel bleed-off tank and the intake passage by opening the bled-off fuel supply valve after the engine is restarted, the communication between the fuel bleed-off tank and the intake passage being shut off when the engine is stopped.

7. The gas circulation engine according to claim 6, wherein the fuel bleed-off control unit closes the fuel bleed-off valve after a predetermined time period has elapsed after the fuel bleed-off valve is opened.

8. The gas circulation engine according to claim 6, further comprising:

a fuel supply control valve that is provided in a second high-pressure fuel supply passage which is located upstream of the first high-pressure fuel supply passage, wherein the fuel bleed-off control unit opens the fuel supply control valve during operation of the engine, closes the fuel supply control valve when the engine is stopped, and keeps the fuel supply control valve closed until the engine is restarted.

9. A gas circulation engine, comprising:

a combustion chamber to which a high-pressure oxidant in a high-pressure oxidant supply passage, and fuel, combustion of which is promoted by the oxidant, are supplied;

a circulation path that connects an intake-side portion and an exhaust-side portion of the combustion chamber to each other;

an oxidant bleed-off tank into which the high-pressure oxidant in the high-pressure oxidant supply passage is bled off;

an oxidant bleed-off valve that permits or shuts off communication between the high-pressure oxidant supply passage and the oxidant bleed-off tank; and an oxidant bleed-off control unit that permits communication between the high-pressure oxidant supply passage and the oxidant bleed-off tank by opening the oxidant bleed-off valve when an engine is stopped, the communication between the high-pressure oxidant supply passage and the oxidant bleed-off tank being shut off during operation of the engine.

10. The gas circulation engine according to claim 9, wherein working gas that generates power with use of the combustion of the fuel and that has a specific heat ratio higher than a specific heat ratio of air is supplied to the combustion chamber; and the circulation path connects the intake-side portion and the exhaust-side portion of the combustion chamber to each other in such a manner that the working gas discharged from the combustion chamber is circulated back to the combustion chamber without being discharged into an atmosphere.

11. The gas circulation engine according to claim 10, further comprising:
- a high-pressure working gas storage tank in which the working gas is stored at a pressure that is higher than a pressure of the oxidant in the high-pressure oxidant supply passage; and
- a working gas supply valve that permits or shuts off communication between the high-pressure working gas storage tank and the high-pressure oxidant supply passage, wherein the oxidant bleed-off control unit opens the working gas supply valve when the engine is stopped.

12. The gas circulation engine according to claim 9, further comprising:
- a bled-off oxidant supply valve that permits or shuts off communication between the oxidant bleed-off tank and an intake passage; and
- a bled-off oxidant control unit that permits communication between the oxidant bleed-off tank and the intake passage by opening the bled-off oxidant supply valve after the engine is restarted, the communication between the oxidant bleed-off tank and the intake passage being shut off when the engine is stopped.

13. The gas circulation engine according to claim 9, wherein the oxidant bleed-off control unit closes the oxidant bleed-off valve after a predetermined time period has elapsed after the oxidant bleed-off valve is opened.

14. The gas circulation engine according to claim 9, further comprising:
- an oxidant supply control valve that is provided in the high-pressure oxidant supply passage, wherein the oxidant bleed-off control unit opens the oxidant supply control valve during operation of the engine, closes the oxidant supply control valve when the engine is stopped, and keeps the oxidant supply control valve closed until the engine is restarted.

\* \* \* \* \*